March 19, 1940.  W. L. MARTIN  2,193,878
CUTTING MACHINE
Filed Feb. 4, 1938  4 Sheets-Sheet 1

INVENTOR
Wendell L. Martin
BY Fisher, Moser & Moore
ATTORNEYS

March 19, 1940.   W. L. MARTIN   2,193,878
CUTTING MACHINE
Filed Feb. 4, 1938   4 Sheets-Sheet 2

INVENTOR
BY Wendell L. Martin
Fisher, Moser & Moore
ATTORNEYS

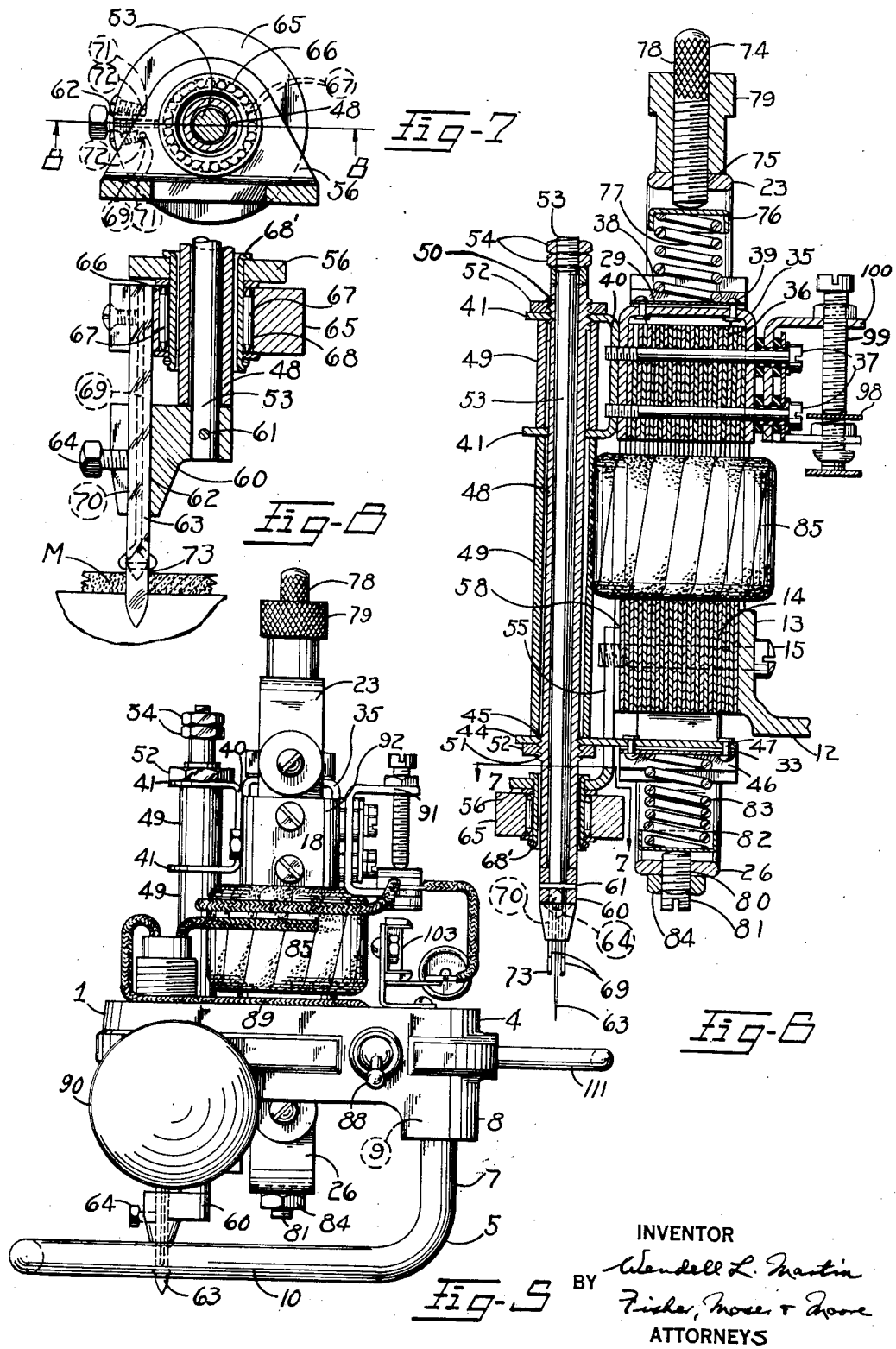

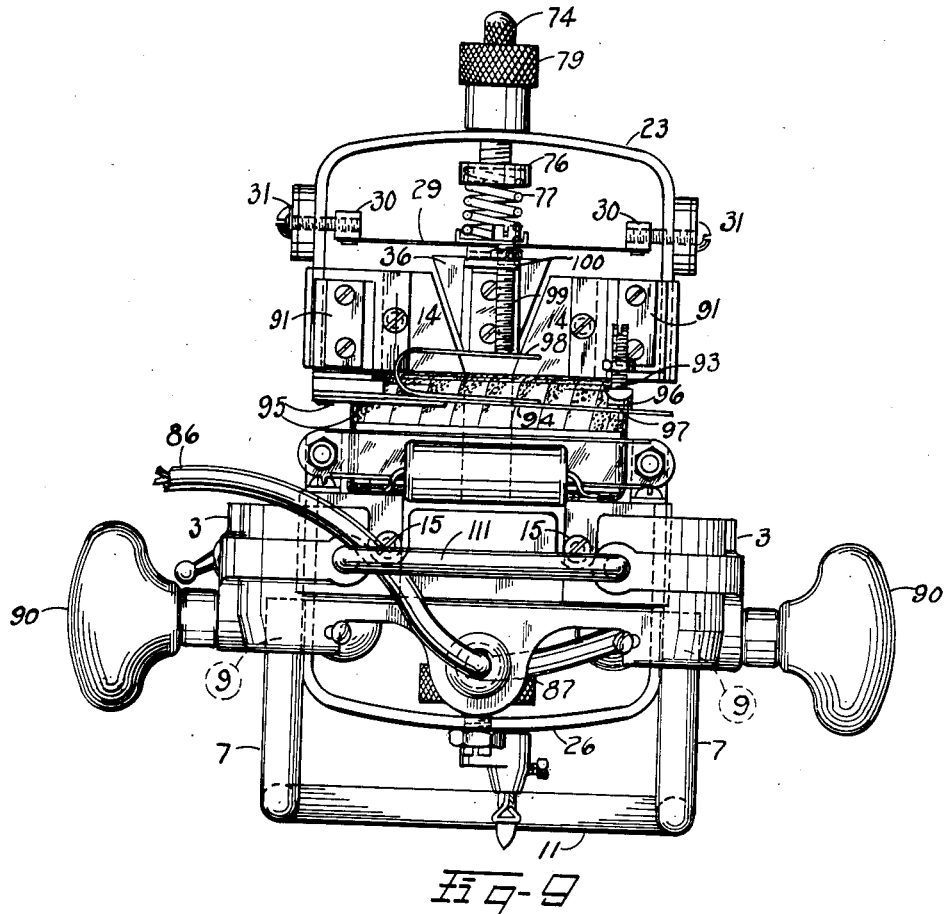

Patented Mar. 19, 1940

2,193,878

UNITED STATES PATENT OFFICE 2,193,878

CUTTING MACHINE

Wendell L. Martin, Cleveland, Ohio, assignor, by mesne assignments, to International Register Company, Chicago, Ill., a corporation of Illinois Application February 4, 1938, Serial No. 188,760

8 Claims. (Cl. 30—275)

This invention relates to cutting machines for cutting out designs and the like from sheet like material.

The principal object of my invention is the provision of a relatively small, compact portable cutting machine adapted to be moved over the surface of the work being cut and which is exceptionally quiet in operation.

A further object of the invention is to provide a cutting machine in which the movement of the stripper foot is independent of the movement of the cutter and to the path created by the cutter whereby the cutter can be operated in opposite directions, that is both forwardly and rearwardly.

A further object is to provide a cutting machine having a reciprocating cutting blade wherein means is provided for controlling the length of the cutting stroke to thus maintain the blade in contact with the work throughout the cutting operation.

A further object is to provide a cutting machine wherein the weight of the machine is adjacent the cutter bar whereby the machine is evenly balanced thus permitting the cutting blade to cut rapidly through thick materials.

A further object is the provision of resilient means connected to the cutter bar for holding the cutting blade in vertical alignment with the work for eliminating and/or minimizing all vibrational stresses and strains incidental to the cutting operations.

Another object is to provide a stripper foot carried independently of the tool holder and adapted to move around the same axis as the tool holder.

Another object is to provide a stripper foot which is adjustably mounted independently of the tool holder and is adapted to be positioned slightly out of engagement with the surface of the work whereby the end thereof serves to clean the blade at the termination of each upstroke thereof.

A further object is to provide a removable base member for supporting the cutting machine in position on the work and which permits the operator to observe the action of the cutting tool from the front, rear or sides of the machine while the same is travelling over the work.

Another object is the provision of formed base and bracket members so positioned that the cutting machine may be tilted at angles of approximately 45 degrees whereby the cutting tool is relieved of strain and freed from engagement with the work thus facilitating access to the tool holder and associated parts to permit of adjustment or replacement thereof.

Another object is to provide an electromagnetic vibrator for actuating the cutter bar and blade wherein means is provided for the adjustment and control of the thrust of the electromagnet.

Other and more specific objects and advantages will be apparent as the following specification is considered in connection with the accompanying drawings, wherein:

Figure 5 is a side elevation of the machine;

Figure 6 is an enlarged section through the cutter assembly and electromagnet;

Figure 7 is an enlarged section on line 7—7 of Figure 6;

Figure 8 is an enlarged section on line 8—8 of Figure 7;

Figure 9 is a rear view of the machine with the cover removed;

Figure 10 is a diagrammatic circuit for direct current; and

Figure 11 is a diagrammatic circuit for alternating current.

Figure 1:
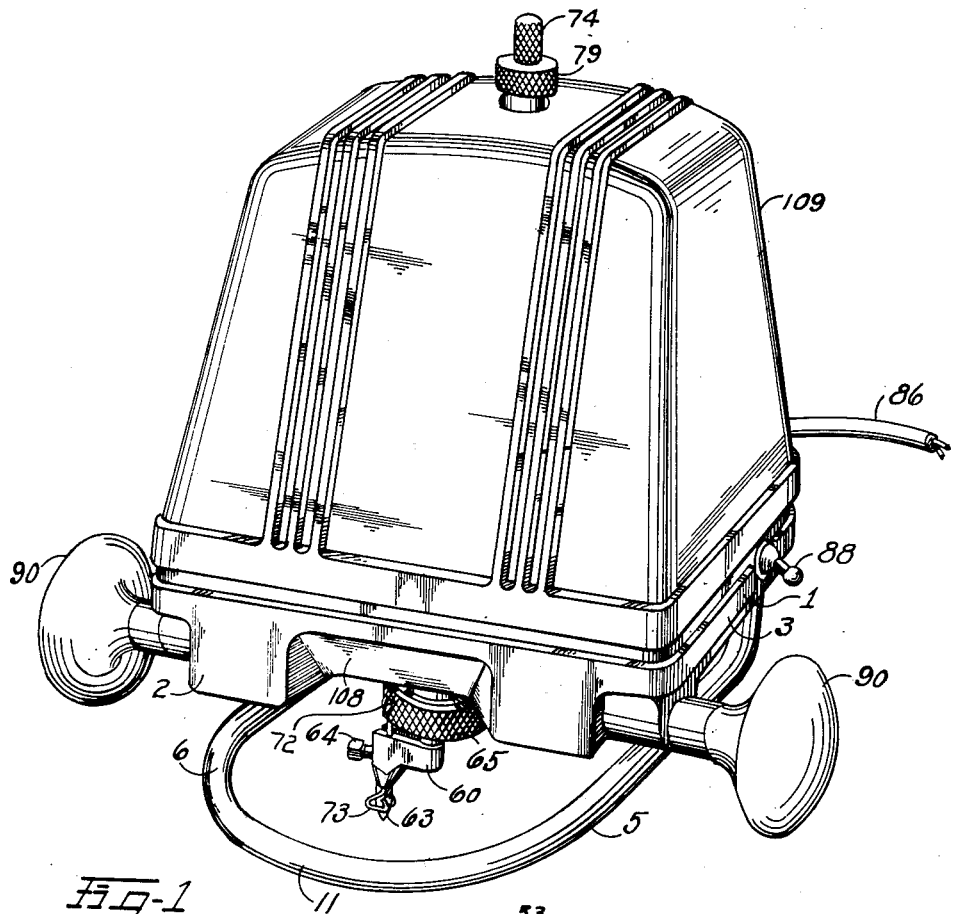
Figure 1 is a perspective view of the assembled cutting machine.
Figure 2:
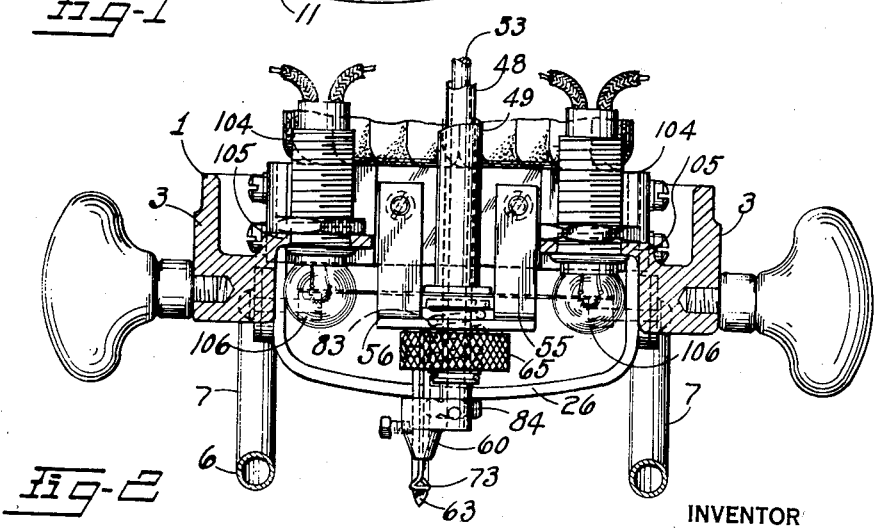
Figure 2 is a partial section on line 2—2 of Figure 4.
Figure 3:
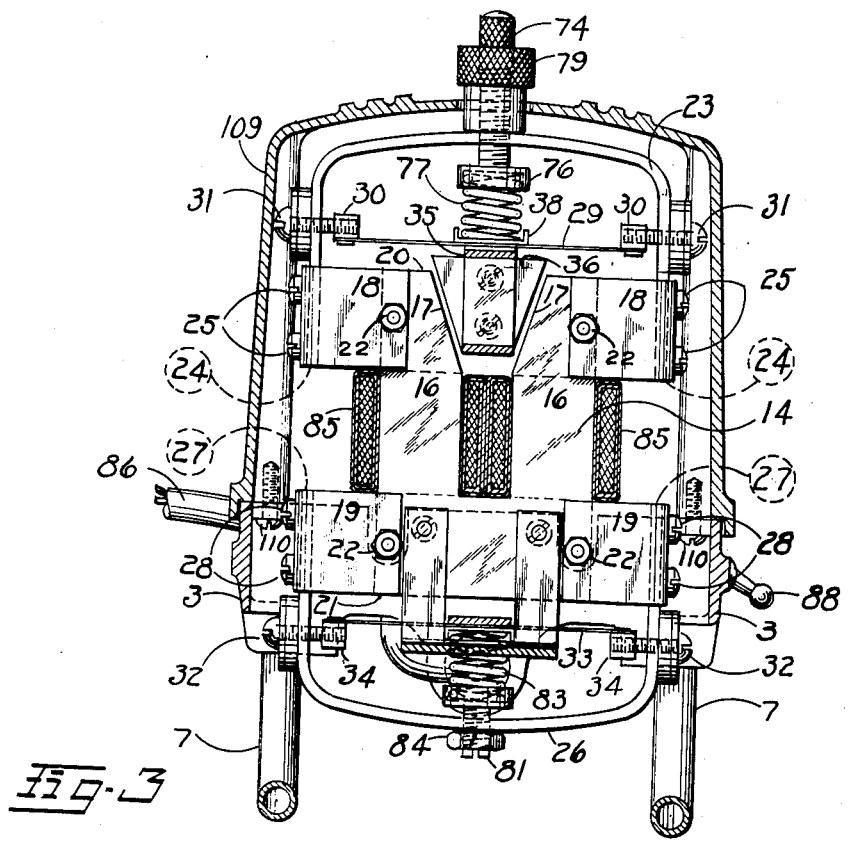
Figure 3 is a section on the line 3—3 of Figure 4.
Figure 4:
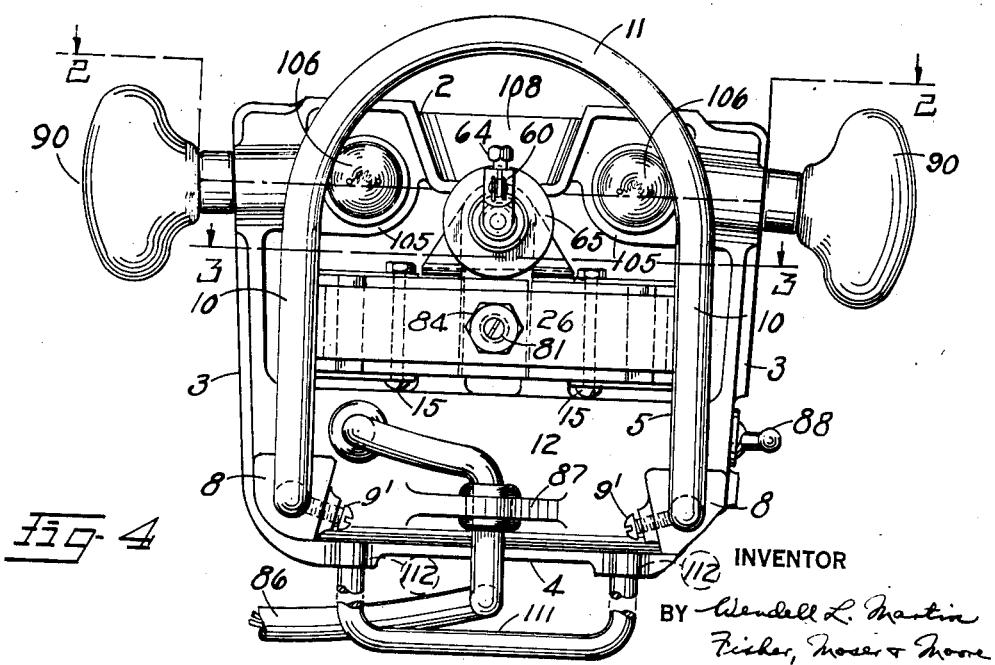
Figure 4 is a bottom view of the machine.

Referring more particularly to the drawings wherein like reference numerals refer to similar parts throughout the several views, numeral 1 denotes an integral, substantially square, supporting casting having front, side and rear walls 2, 3 and 4, respectively, which casting is mounted upon and spaced a substantial distance above a base member 5. The base is comprised of a substantially U-shaped resilient metal runner 6, preferably substantially circular in cross section, the relatively straight parallel side portions 10 thereof being bent upwardly at their ends to form two vertical leg portions 7 which are fixedly but removably positioned within bores or recesses 9 in two downwardly depending lugs or bosses 8, integrally formed in the corners of the rear wall 4 of the casting, by means of screws 9'. The curved or bowed forward portion 11 of the runner 6, extends slightly beyond the front wall 2 of the casting. Thus, the curved undersides of the runner are adapted to rest and support the casting and machine on the surface of the work being cut and will slide thereover in a manner hereinafter described.

A substantially rectangular body portion 12 extending inwardly from the rear wall 4 of the supporting casting is provided with a web or wall 13 to which a laminated U-shaped core 14 is rigidly secured by suitable means, such as rivets 15. The core 14 has spaced vertical arms 16, the upper ends of which are beveled to provide converging inner faces 17. Substantially U-shaped, outwardly extending, upper and lower brackets 18 and 19 are secured to the sides of the core arms 16 at the upper and lower ends 20 and 21 respectively, by suitable means, such as rivets 22. The lower ends 24 of an upstanding inverted U-shaped upper metal strap 23, extending a suitable distance above the upper ends 20 of the core arms, are secured to the upper brackets 18 by rivets or the like 25, and the upper ends 27 of a downwardly extending U-shaped lower metal strap 26, extending a suitable distance below the lower ends 21 of the core arms, are likewise secured to lower brackets 19 by rivets or the like 28. An upper flat steel leaf spring 29 is provided with blocks 30 at its ends for adjustably securing the leaf spring to the sides of the upper strap 23 by means of threaded bolts or the like 31. The sides of the lower U-shaped strap 26 are likewise adjustably secured by means of threaded bolts 32 to the blocks 34 on the ends of a lower similarly formed lower leaf spring 33, for a purpose to be presently described. Thus it will be noted that the upper and lower straps and leaf springs are positioned above and below and extend across the ends of the U-shaped laminated core 14.

An inverted U-shaped clamping plate 35 fits over and is rigidly attached by screws 37 to the front and rear faces of a wedge shaped armature or core 36 which extends or seats within the beveled portions 17 on the upper end of the U-shaped laminated core 14. Thus, the upper end of the clamping plate 35 is positioned beneath the upper lead spring 29 and is preferably fixedly secured by rivets or the like 39 to a relatively narrow channel plate 38 on the top face of the said leaf spring, whereby the leaf spring will be caused to vibrate or flex when the wedge shaped armature 36 reciprocates, as hereinafter described in detail. An outwardly extending supporting bracket 40, having upper and lower apertured ears 41 thereon, is secured to the front face 42 of the clamping plate 35 by the screws 37. An outwardly extending supporting bracket clip 44, having an aperture 45 in the outer end thereof, is positioned above the lower leaf spring 33 and fixedly secured by rivets 47 to a channel plate 46 on the under side of the said leaf spring, whereby the bracket and spring will be caused to vibrate or reciprocate in a similar manner to the corresponding upper bracket and spring described above.

A tubular sleeve 48 extends through the apertured ears 41 and aperture 45 of the upper and lower supporting brackets 40 and 44 respectively, and two spacers or sleeves 49 are mounted between the said apertured ears 41 and bracket clip 44. The sleeves or spacers 49 in addition to encasing and protecting the sleeve 48 serve to brace and support the bracket ears 41 and bracket 44 in position. The tubular sleeve 48 is retained in position in the spacers and brackets by means of lock nuts 52 mounted on a threaded portion 50 of the sleeve extending above the upper bracket ear 41 and a threaded section 51 below the lower bracket 44, which nuts abut and clamp the sleeve against the brackets. A tubular cutter bar or plunger shaft 53 is loosely sleeved within the tubular sleeve 48 and held in position therein by two nuts or the like 54 threaded on the upper end thereof in abutting relation with the upper end 50 of the tubular sleeve 48. The lower end of the cutter bar extends through an apertured ear 56 of a substantially L-shaped bracket 55 which is secured to the front face 58 of core 14 by the screws 15. A blade carrier 60 is fixedly attached to the extreme lower end of the cutter bar 53 by a pin 61 whereby the blade carrier and cutter bar turn about an axis extending in the direction of reciprocation of the tubular sleeve 48, in a manner hereinafter described. A vertical slot 62 is provided in the blade carrier for the reception of a blade 63 which is adjustably held in position therein by a set screw 64, whereby the blade is offset laterally with respect to the swivel axis about which the cutter bar 53 turns in sleeve 48. The preferred form of blade has its front and rear edges ground at the lower end so that this end of the blade tapers to a point and the side faces thereof taper to front and rear downwardly converging cutting edges, the cutter blade being positioned with its cutting edges in a plane disposed radially with respect to the swivel axis, so that the blade will readily follow the direction of the cutter bar and supporting frame. In some instances where heavy duty materials, such as plywood and the like are being cut it may be desirable to utilize a sawtooth blade, not shown, in place of the above described double cutting edge blade.

A knurled disc 65 is rotatably mounted, by means of a series of vertically arranged needle roller bearings 67, on a relatively short sleeve or bearing race 68' which is suitably secured to and is suspended from the bracket ear 56. Thus, as the bearings 67 engage with the bore 68 of the disc, the disc is adapted to freely rotate about the vertical axis of the sleeves 68' and 48, respectively, for a purpose hereinafter explained. A stripper foot comprised of two relatively fine straight wires 69 extends through two apertures 70 in the blade carrier 60 on either side of the slot 62 therein, and the upper ends thereof are rigidly but adjustably secured in two apertures 71 in the disc flange by set screws or the like 72. The lower ends of the stripper foot wires 69 are looped and flattened, as at 73 to form two relatively flat members which flattened portions are spaced a slight distance above the surface of the material being cut and through or between which the cutter blade 63 projects and reciprocates during the cutting operation to be presently described. The machine can be operated in both directions, that is forwardly and then rearwardly due to the fact that the stripper foot is fixedly supported with respect to the reciprocating cutter and the looped and flattened ends 73 thereon are spaced above the material and therefore does not engage the surface of the material and thus follow in the groove or cut created by cutter blade. Consequently the cutter blade may be moved forwardly by proper manual manipulation of the machine, to cause one cutting edge to operate on the material and then, after a slight turning movement of the machine, the latter may be moved rearwardly, or in a direction substantially opposite to the forward movement, thus causing the same cutting edge of the blade to act on the material. This is not possible with prior devices in which the presser foot engages in the groove or cut made by the cutter.

A threaded adjusting screw 74 extends through a centrally located threaded aperture 75 in the upper inverted U-shaped bracket 23 and is provided on its lower end with a spring engaging collar 76 which abuts the upper end of an upstanding coil spring 77 seated on the channel plate 38 connected to the upper face of the leaf spring 29. The upper end of the screw 74 is knurled, as at 78 for convenient vertical adjustment of the same to increase or decrease the tension of coil spring 77 thereby controlling the amount of pressure of the latter on the leaf spring. A knurled lock nut 79 is threaded on the adjusting screw and serves to lock the screw and coil spring in any set position in order to maintain the desired amount of pressure on the flat leaf spring 29 for a purpose hereinafter described. The lowermost U-shaped strap 26, previously referred to, is likewise provided with a preferably centrally located threaded aperture 80, through which a threaded adjusting screw 81 is adapted to upwardly extend. Fixedly mounted on the upper end of the screw 81 is a spring engaging collar 82 for engagement with the lower end of an upstanding coil spring 83. The upper end of this spring seats against the channel plate 46 connected to the underside of the lower flat leaf spring 33, and a nut 84 on the outer end of the screw serves to lock the screw and to permit of vertical adjustment of the same in order to control the tension of the spring and govern the pressure acting upon the leaf spring.

It will be noted that the pitch of the two topmost convolutions of coil spring 83 are of much wider pitch than five lowermost convolutions. The purpose of this is to have these springs correspond in load characteristics to the pulling power or pull characteristics of the magnet or coil 14, for the purpose of eliminating the whipping or slapping action which would otherwise occur at the end of the stroke of armature 36.

As the armature or core 36 approaches the end of its downward stroke and the pull of the laminated core or pole piece 14 is therefore increased, the lower convolutions of springs 83 offer correspondingly increased opposition or cushioning action to this downward movement of the armature and will finally stop the same entirely as the faces of the armature and pole pieces meet. This eliminates the objectionable noise created when two pieces of metal are slapped together.

In the operation of the machine, the U-shaped core 14 is intermittently energized, drawing the wedge shaped core or armature 36 into engagement with the converging inner faces 17 thereof, and upon deenergization of the core 14, the armature is moved upwardly by the flexing action of the upper and lower flat leaf springs 29 and 33. As the cutter bar 53 is fixedly mounted on the wedge shaped armature 36, the movement of the latter, through intermittent energization of the core 14, also results in the cutter bar being reciprocated whereby the cutter blade 63 cuts through the material over which the machine is moved by the operator who grasps knobs or handles 90 extending laterally from the forward end of the side walls 3 of the casting, as will hereinafter be described in detail.

The core 14 is energized by means of coils 85 which are wound about the spaced vertical arms 16 of the core. The coils 85 receive electric current through an extension cord 86, extending through an apertured downwardly depending lug 87 on the underside of rear casting wall 4, which is connected to the coils through a manually operated switch 88 positioned in a side wall of the casting, and a wire 89.

It is usually preferable to provide means adapting the device to be operated either by direct or alternating current. To this end, means is provided for automatically interrupting the current through the coils during the downward movement of the armature by means of a circuit breaker, which includes a switch mounted on brackets 91 secured to the rear faces 92 of the upper brackets 18. The switch consists of a rigid conductor screw 93 and a spring conductor element 94 secured at one end to one of the brackets 91 by rivets 95, and the conductor elements being provided with contact points 96 and 97. The spring conductor element 94 is provided with a vibrator spring 98 which is adapted to be engage by a vertical screw 99 carried by a bracket 100 secured to the armature whereupon the downward movement of the armature causes the screw to push the vibrator spring 98 downwardly to separate the contact points 96 and 97. The conductor elements 93 and 94 are connected to the coils 85 by wires 101 and 102. When the extension cord 86 is plugged into a direct current line, the circuit through the coils 85 is broken each time the armature 36 is pulled into engagement with the core 14 and the circuit is re-established during the upward movement of the armature. A condenser 103 is preferably connected across the contact points 96 and 97. A resistance coil 97' is connected across the parts 97 and 98 to allow the voltage, built up at the instant of breaking, to bleed off, or, in other words, to cut down the high peak. The aforesaid direct current circuit is shown diagrammatically in Figure 10.

When the device is used on an alternating line, all that is necessary is to adjust the screw 99 upwardly a sufficient distance to clear the spring vibrator spring arm 98 of the circuit breaker, as will be apparent by reference to the alternating current diagram shown in Figure 11.

Two light sockets 104 of conventional type are positioned in integral ears 105 preferably formed on the forward wall 2 of the supporting casting 1 for the reception of suitable lamp globes 106, preferably of the six to eight volt type. Thus the bulbs extend downwardly into the casting and are disposed on either side of the cutter blade carrier adjacent the lower end thereof, whereby the surface of the work is illuminated in an obvious manner. The lamp sockets 104 are connected to the induction coils 85 and the manually operated switch 88 by wires 107 and 108, as shown in the diagrammatic circuit in Figure 10.

During the operation of the machine, the cutter unit is moved in any direction over the material M being cut, which may be one or more layers of sheet material such as cardboard, paper, ply wood, or the like, and due to the blade carrier being fixedly positioned on the lower end of the cutter bar 53, the carrier and blade will swing to a position where the blade is trailing the cutter bar as the latter is rapidly reciprocated in the aforementioned manner. The blade may thus be caused to follow an irregular line on the work being cut by sliding the unit on the material. The front wall 2 of the supporting casting is recessed as at 108, to provide a clear view of the cutting blade assembly as the machine is moved over the work, as shown in Figure 1.

By adjusting the upper and lower adjusting screws 74 and 81, respectively, the tension of the coil springs 77 and 83 acting on the upper and lower flat leaf springs 29 and 33 respectively is increased or decreased thus controlling the amount of pressure of the said leaf spring on the wedge shaped armature 36 and core 14. When the pressure on the leaf spring is decreased, in the aforesaid manner, the space or gap between the wedge shaped armature 36 and converging seating faces 17 of the core 14 is thus increased as the armature will move or adjust itself upwardly. Therefore it follows, that when the space or gap between the core and armature is increased and the core intermittently energized, the armature will be caused to move through a greater distance before contacting the seating faces of the core. This results in the reciprocatory stroke of cutter bar, blade carrier and blade being increased to cut through a thicker or denser material, or for other purposes. If desirable, the stroke of the cutter bar and blade may be shortened by adjustment of the adjusting screws and increasing the tension of the coil springs whereby the armature will travel a shorter distance between contacting faces 17 of the core 14. Regulation of the blade stroke in the above manner keeps the blade embedded in and prevents the same from jumping away from or leaving the work, thus eliminating the necessity of providing a guide for the blade. As the stripper foot wires 69 are fixedly secured in the rotatable but non-reciprocable disc flange 65 and the flattened lower portions 73 of the stripper foot terminate a slight distance above the plane of the work, the cutter blade reciprocates therethrough and on the upstroke of the blade, the material will be lifted upwardly into engagement with the lower flattened ends of the stripper foot wires and stripped therefrom in an obvious manner. Thus it will be noted that as the stripper foot is not supported on the work, there is no weight on the latter at any time, and consequently no danger of marking or marring soft material.

The weight of the machine is adjacent or approximate to the vertical axis of the cutter bar thereby permitting the cutter to reciprocate rapidly and with ease through relatively thick and dense materials thus evenly balancing the device on the surface of the work.

The flat leaf springs on the upper and lower ends of the armature and core members serve to maintain the blade carrier and blade in vertical alignment throughout the cutting operation, and by adjusting the side screws 31 on the upper leaf spring 29 the armature may be adjusted laterally to bring the same into alignment with the converging seating faces 17 of the core, so that the gap or space therebetween may be adjusted to shorten the stroke of the armature with consequent reduction of the noise produced by contact between the armature and core.

The actuating mechanism is preferably enclosed by a cover 109 which rests upon the top of the supporting casting 1 and is secured in place thereon by suitable means, such as screws 110.

A substantially U-shaped bracket 111 is mounted in apertures 112 in the rear wall 4 of the supporting casting and extends laterally therefrom. This permits the machine to be tilted rearwardly to an angle of approximately forty-five degrees when the operator desires to disengage the cutting blade from the work to facilitate replacement or adjustment of the blade and associated parts. This bracket arrangement also serves to relieve the blade of undue stresses and strains which otherwise would be caused were the machine to be left in normal upright position with the blade imbedded in the work when the cutting operation is temporarily discontinued.

Due to the resiliency of the metal stock from which the base 5 is made, and the construction and point of attachment of the runner part 6 thereof to the frame, it is possible to manually move the stripper foot downwardly into engagement with the work. This sometimes becomes advisable in the cutting of hard fibrous material or board, if the material has a tendency to rise or be pulled upwardly unduly due to the action of the cutter blade on its up stroke, when the blade engages the roughened edges along the line of the cut. This movement of the stripper foot down upon the work, to hold the latter to the work table, is accomplished by the operator pressing downwardly on the handles 98, thus causing the cutter frame and the stripper foot to move downwardly relatively to the resilient runner part 6, in an obvious manner.

It will be apparent that the present invention provides a simple, rugged, compact and highly efficient unit for cutting irregular designs and the like in various sheet materials by guiding the machine over the surface of the work, with the bowed cylindrical resilient base runner riding lightly thereover and smoothing or flattening the material in advance of the cutter blade assembly when the machine is moved in a forward or sidewise direction.

Furthermore, it is to be understood that the particular form of apparatus shown and described, is presented for purposes of illustration and that various modifications of said apparatus can be made without departing from my invention, as defined in the appended claims.

Having thus described my invention what I claim is:

1. A cutter of the character described comprising a supporting frame having a base attached thereto and adapted to slide on material being cut, power means on said frame, a plunger bar fixedly and rotatably supported on said power means and reciprocated thereby, a tool holder fixedly secured to the end of said bar and having a downwardly depending cutter blade positioned therein, bearing means on the lower end of said bar above said tool holder, said means being rotatable with but non reciprocable on said bar, a stripper member relatively slidable through said tool holder and adjustably positioned in said bearing means, said stripper member being normally disposed above and out of contact with the material being cut, said base being resilient and spaced from the frame whereby said frame and stripper foot may be pressed downwardly to bring said stripper foot into resilient contact with the material being cut.

2. A cutter of the character described comprising a supporting frame having a base member spaced from the frame adapted to slide over material being cut, a plunger reciprocably mounted in said frame, a tool holder carried by the plunger for movement therewith, said tool holder having tool receiving means eccentric to said plunger, a stripper foot, means on said frame for normally supporting said stripper foot out of contact with the material being cut, power means supported on the frame for reciprocating the plunger, said base member being resilient whereby said frame may be forced downwardly to bring said stripper foot into contact with the material being cut.

3. A cutter of the character described comprising a supporting frame having a resilient base adapted to slide over the material being cut, a plunger reciprocably mounted in said frame, a tool holder carried by the plunger for movement therewith, said tool holder having tool receiving means eccentric to said plunger, a stripper foot normally supported by said frame out of contact with the material being cut, power means for reciprocating said plunger, said base being connected at one end to said frame and at its free end spaced from said frame, and means on said frame whereby the frame may be conveniently forced downwardly toward the free end of said resilient base member to bring said stripper foot into contact with the material being cut.

4. A cutter of the character described comprising a supporting frame having a base attached to and spaced therefrom adapted to slide on material being cut, power means mounted on said frame, a plunger bar rotatably supported on said power means and reciprocated thereby, a tool holder fixedly secured to the end of said bar and having a downwardly depending cutter blade positioned therein, rotatable bearing means on said bar above said tool holder, a stripper member relatively slidable through said tool holder and fixedly positioned in said bearing means, said stripper member being out of contact with the material being cut but engaging the material on the upstroke of the blade and stripping the material therefrom.

5. A cutter of the character described comprising a supporting frame having a base attached thereto and adapted to slide on material being cut, power means on said frame, a plunger arm fixedly and rotatably supported on said power means and reciprocated thereby, a tool holder fixedly secured to the end of said bar and having a downwardly depending cutter blade positioned therein, bearing means on the lower end of said bar above said tool holder, said means being rotatable with but non reciprocable on said bar, a stripper member relatively slidable through said tool holder and adjustably positioned in said bearing means, said stripper member being normally disposed above and out of contact with the material being cut.

6. A cutter of the character described comprising a supporting frame having a base attached thereto and spaced therefrom adapted to slide on the material being cut, power means on said frame, a plunger bar supported on and actuated by said power means, a cutter carried by said bar, and spring means on said power means for regulating the stroke of said cutter, and bracket means on said frame cooperating with said base for supporting the cutter when the latter is tilted out of engagement with the material being cut.

7. A cutter of the character described comprising a supporting frame having a base attached thereto and spaced therefrom adapted to slide on the material being cut, power means on said frame, a plunger bar supported on and actuated by said power means, a cutter carried by said bar, spaced spring means on the ends of said power means for regulating the stroke of said cutter, and outwardly extending bracket means on said frame cooperating with said base for supporting said cutter when tilted out of engagement with the material being cut.

8. A cutter of the character described comprising a supporting frame having a base attached thereto and spaced therefrom adapted to slide on the material being cut, power means on said frame, a plunger bar supported on and actuated by said power means, a cutter carried by said bar, spring means on said power means for regulating the stroke of said cutter, and outwardly extending bracket means on said frame above said cutter and base and cooperating with said base for supporting said cutter when tilted out of engagement with the material being cut.

WENDELL L. MARTIN.